(12) United States Patent
Rahman

(10) Patent No.: US 10,754,502 B2
(45) Date of Patent: Aug. 25, 2020

(54) FRAMEWORK FOR CONTEXTUAL NOTIFICATIONS

(71) Applicant: Microsoft Technology Licensing, LLC, Redmond, WA (US)

(72) Inventor: Fahrim Ur Rahman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 15/880,483

(22) Filed: Jan. 25, 2018

(65) Prior Publication Data

US 2019/0227697 A1    Jul. 25, 2019

(51) Int. Cl.
| | |
|---|---|
| G06F 3/0481 | (2013.01) |
| G06T 19/00 | (2011.01) |
| G06F 16/23 | (2019.01) |
| G06F 16/903 | (2019.01) |
| G06F 9/451 | (2018.01) |
| G06F 9/54 | (2006.01) |

(52) U.S. Cl.
CPC .......... *G06F 3/04817* (2013.01); *G06F 9/451* (2018.02); *G06F 9/542* (2013.01); *G06F 16/23* (2019.01); *G06F 16/90344* (2019.01); *G06T 19/006* (2013.01)

(58) Field of Classification Search
CPC ......... G09G 5/00; H04L 29/08; H04L 67/306; G06F 3/0488; G06F 16/23; G06F 16/90; G06F 9/451; G06F 9/542; G06F 3/04817; G06K 9/00671; H04N 13/0497; G06T 19/006

See application file for complete search history.

(56) References Cited

U.S. PATENT DOCUMENTS

| | | | | |
|---|---|---|---|---|
| 5,828,882 | A * | 10/1998 | Hinckley | G06F 9/542 |
| | | | | 719/318 |
| 6,275,232 | B1 | 8/2001 | Cataudella et al. | |
| 7,426,512 | B1 * | 9/2008 | Ben-Natan | G06F 21/55 |
| 8,346,788 | B1 * | 1/2013 | Kim | G06F 16/20 |
| | | | | 707/756 |

(Continued)

FOREIGN PATENT DOCUMENTS

WO    0225431 A2    3/2002

OTHER PUBLICATIONS

"International Search Report and Written Opinion Issued in PCT Application No. PCT/US2018/068099", dated Apr. 9, 2019, 12 Pages.

(Continued)

*Primary Examiner* — Steven P Sax

(57) ABSTRACT

A framework for implementing contextual notifications is provided. According to one set of embodiments, a computer system can receive a notification including a context identifier. The computer system can further attempt to match the context identifier to an object created or instantiated by an application running on the computer system. If the attempt to match is successful, the computer system can invoke a notification handler associated with the object or with the application, where the notification handler is configured to present, in a user interface of the computer system, the contents of the notification contextually with respect to the object.

15 Claims, 4 Drawing Sheets

(56) References Cited

U.S. PATENT DOCUMENTS

| | | | | |
|---|---|---|---|---|
| 8,495,153 | B1* | 7/2013 | Muthukrishnan | G06F 9/546 709/200 |
| 9,358,471 | B1 | 6/2016 | Mello et al. | |
| 9,760,790 | B2 | 9/2017 | Novak | |
| 9,846,880 | B2* | 12/2017 | Fordyce, III | G06Q 10/10 |
| 10,122,598 | B2* | 11/2018 | De Armas | H04L 43/04 |
| 10,346,223 | B1* | 7/2019 | Sharifi | G06F 21/62 |
| 2003/0074222 | A1* | 4/2003 | Rosow | G06Q 10/0875 705/2 |
| 2004/0177271 | A1* | 9/2004 | Arnold | G06Q 10/107 713/154 |
| 2008/0120558 | A1 | 5/2008 | Nathan et al. | |
| 2013/0044128 | A1 | 2/2013 | Liu et al. | |
| 2013/0044129 | A1* | 2/2013 | Latta | G09G 5/00 345/633 |
| 2014/0351312 | A1* | 11/2014 | Lu | H04L 67/10 709/201 |
| 2015/0271630 | A1* | 9/2015 | Ferrara | H04W 8/18 455/456.3 |
| 2016/0025981 | A1 | 1/2016 | Burns et al. | |
| 2016/0026253 | A1 | 1/2016 | Bradski et al. | |
| 2016/0050168 | A1* | 2/2016 | Zutphen | H04L 51/046 715/752 |
| 2016/0180602 | A1* | 6/2016 | Fuchs | A63F 13/213 463/31 |
| 2016/0210578 | A1* | 7/2016 | Raleigh | G06Q 30/0207 |
| 2016/0253842 | A1 | 9/2016 | Shapira et al. | |
| 2016/0323219 | A1* | 11/2016 | Brecx | G06Q 50/01 |
| 2018/0054351 | A1* | 2/2018 | Bhandari | H04L 41/0686 |
| 2018/0096507 | A1* | 4/2018 | Valdivia | G06F 3/011 |
| 2018/0098059 | A1* | 4/2018 | Valdivia | H04N 7/142 |
| 2019/0122045 | A1* | 4/2019 | Ravi | G06K 9/00288 |

OTHER PUBLICATIONS

Alvarado, Hamilton Andrés Hernández, "WeSketch: A 3D Real Time Collaborative Virtual Environment that Improves the GUI Sketching Task", In Thesis of EAFIT University, Nov. 2010, 69 pages.

* cited by examiner

FRAMEWORK FOR CONTEXTUAL NOTIFICATIONS

BACKGROUND

Most modern operating systems (OSs) provide a mechanism to notify a user of something that has happened, usually referred to as a notification or a "toast." These notifications are typically placed in a global notification area that is designed to hold all notifications received system-wide. For instance, in Windows, a user can view all of his/her notifications in an area known as the action center and can see these notifications appear in the bottom-right corner of the desktop.

Some OSs allow certain notifications to be displayed proximate to a user interface (UI) element or application object to which the notifications pertain (in addition to, or in lieu of, displaying them in the global notification area). Such notifications are referred to herein as contextual notifications. For example, in iOS, a contextual "badge" notification can be displayed on top of an application icon that indicates the number of new, unread items received by that application (e.g., unread emails). As another example, in Windows Phone OS, a contextual "tile" notification can be displayed on top of an application tile that presents a notification payload received by that application.

However, in existing implementations, the presentation of these contextual notifications is generally handled (1) entirely at the OS level or (2) entirely at the application level. With approach (1), an application developer cannot customize the way in which his/her application's contextual notifications are shown to an end-user; instead, all such notifications are presented generically in the manner dictated by the OS (such as, e.g., iOS badge notifications). With approach (2), the application developer has freedom to define exactly how contextual notifications should be displayed with respect to the application's objects, but the main process of the application must be running at the time contextual notifications are received in order for the application to intercept and present the notifications.

SUMMARY

A framework for implementing contextual notifications is provided. According to one set of embodiments, a computer system can receive a notification including a context identifier. The computer system can further attempt to match the context identifier to an object created or instantiated by an application running on the computer system. If the attempt to match is successful, the computer system can invoke a notification handler associated with the object or with the application, where the notification handler is configured to present, in a user interface of the computer system, the contents of the notification contextually with respect to the object.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure is directed to an improved framework for implementing contextual notifications on a computer system or device (generically referred to herein as a "computer system"). At a high level, this framework enables an OS of the computer system to match an incoming notification to an application object that has been registered with the OS and thereby identify the object as the target of the notification. The OS can perform this step by, e.g., comparing a context identifier (ID) included in the notification payload against the context IDs of all objects registered in the system and finding the object with a matching context ID. Upon identifying the object as the target of the notification, the OS can invoke a special notification handler that is associated with the object's application (or with the object itself), but is separate from the application's main process. For example, this notification handler may be an executable file that is distinct from the application's main executable file. The notification handler can then execute code (as defined by, e.g., the application developer) for processing and presenting the notification contextually with respect to the object in the system UI (e.g., alongside the object, on top of the object, etc.).

With the framework above, a number of advantages can be realized over existing approaches to implementing contextual notifications. First, since application developers (rather than the OS developer) can define the code executed by the notification handler, each application developer can control and customize exactly how contextual notifications will appear for his/her respective application objects. This, in turn, allows for greater flexibility and variety in the types of contextual notifications that may be supported by the system.

Second, because the OS is responsible for matching incoming notifications to application objects and because each notification handler is separate from its corresponding application's main process, there is no need for the main process to be running at the time notifications are received in order for those notifications to be presented contextually. Instead, the application's main process can remain inactive while the notification handler (which will typically be more lightweight and less resource-intensive than the main process) carries out the focused task of processing and presenting contextual notifications.

The foregoing and other aspects of the present disclosure are described in further detail below.

2. System Environment

Figure 1:
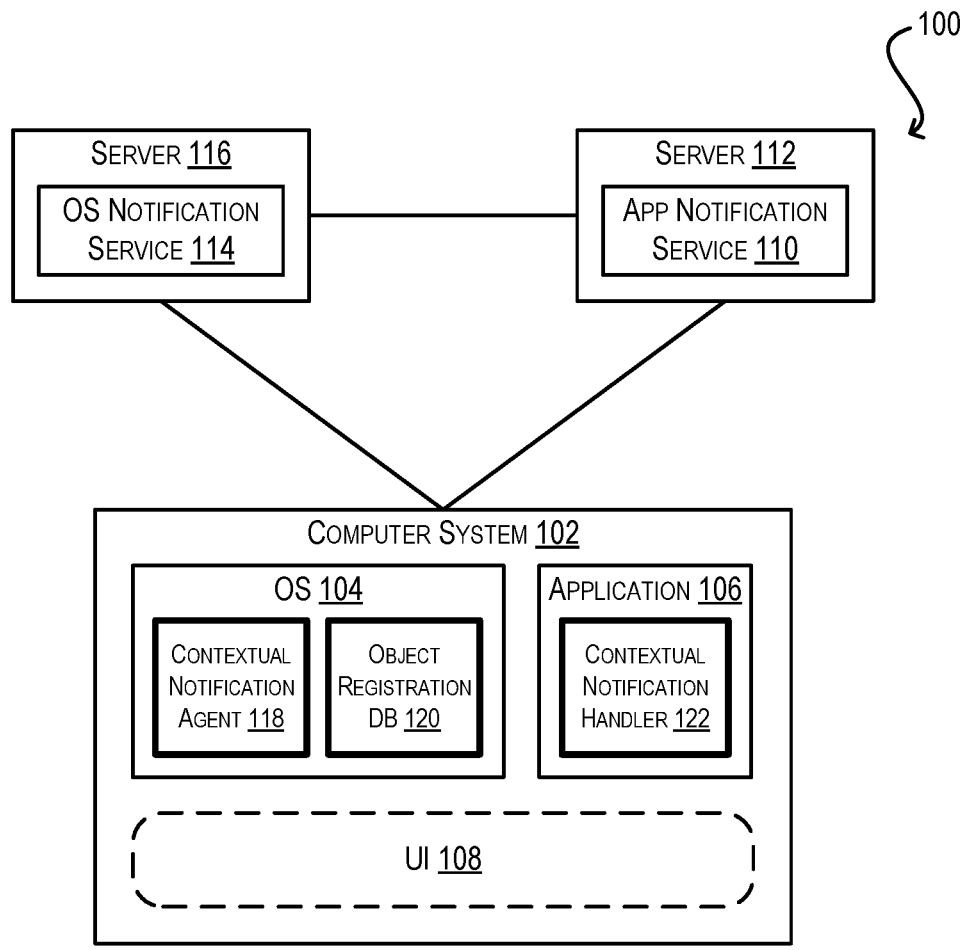
FIG. 1 is a simplified block diagram of a system environment according to certain embodiments.

FIG. 1 depicts a system environment 100 in which embodiments of the present disclosure may be implemented. As shown, system environment 100 includes a computer system 102 comprising an OS 104 and application 106. OS 104, in conjunction with application 106, is configured to generate and present a graphical UI 108 through which a user can interact with computer system 102. In the case where computer system 102 is a system/device incorporating or connected to a traditional two-dimensional (2D) display (e.g., computer monitor, television, etc.), UI 108 may be a computer desktop or other similar 2D-based UI. In the case where computer system 102 is a system/device incorporating or connected to a display that is capable of presenting a three-dimensional (3D) space (e.g., a virtual reality or mixed reality headset), UI 108 may be a virtual reality or mixed reality environment or other similar 3D-based UI.

In addition to computer system 102, system environment 100 includes an application notification service 110 running on a server 112 and an OS notification service 114 running on a server 116. Generally speaking, application notification service 110 and OS notification service 114 enable the generation and delivery of notifications pertaining to application 106 (and other applications) to computer system 102. For example, assume application 106 is an instant messaging application. In this scenario, application 106 can register computer system 102 with services 110/114 in order to receive notifications for instant messages sent to a particular user (e.g., user A) of system 102. Then, when application notification service 110 determines that an instant message has been received for user A, service 110 can create a new notification with the message content and send the notification to OS notification service 114, which in turn can forward the notification to computer system 102 when the system is available (i.e., powered-on and online). Finally, OS 104 of computer system 102 can receive the notification from OS notification service 114 and present the notification within UI 108.

As noted the Background section, many modern OSs place incoming notifications in a global notification area that is designed to hold notifications for all applications running on the system (e.g., the action center in Windows, the notification shade in iOS/Android, etc.). Some OSs also support contextual notifications, which are notifications that are displayed in the context of a particular UI element or object of an application (e.g., in proximity to that element/object in the system UI). However, existing approaches for implementing contextual notifications suffer from various limitations. For instance, one existing approach handles contextual notifications entirely at the OS level in a generic fashion and thus cannot support customized notification handling logic that is unique to a specific application or target object. Another existing approach handles contextual notifications entirely at the application level and thus requires the main process of an application to be running at all times in order to intercept and process notifications (which may not be possible or desirable if the main process is resource-intensive).

To address these and other similar issues, OS 104 of FIG. 1 is enhanced to include a novel contextual notification agent 118 and object registration database 120, and application 106 of FIG. 1 is enhanced to include a novel contextual notification handler 122. Although contextual notification handler 122 is shown as being part of application 106, in various embodiments handler 122 is assumed to be a computing process that is distinct from, and thus can run independently of, the main process of application 106. For example, contextual notification handler 122 may be an executable file that is distributed with application 106 but is separate from the main executable file of application 106.

As detailed in the sections that follow, components 118, 120, and 122 can work in concert to implement contextual notifications in a manner that is more flexible and efficient that existing approaches. For example, in one set of embodiments, contextual notification agent 118 can carry out an initial workflow for registering, in object registration database 120, objects that are created/instantiated by application 106 and are potential targets for a contextual notification. Such objects can include, e.g., document objects, user objects, virtual characters in a 3D space, UI elements, or any other type of entity that can be visually presented in UI 108. The registration workflow can comprise associating each object with a context ID that identifies a notification context represented by that object.

Then, at the time OS 104 receives a contextual notification from OS notification service 114 for an object of application 106, contextual notification agent 118 can carry out a workflow for handling the notification in conjunction with contextual notification handler 122. This workflow can involve, among other things, matching a context ID included in the received notification to a particular object in object registration database 120 (thereby identifying the object as the target for the notification) and determining whether the object is currently "in scope" to a user of computer system 102 (e.g., is visible in UI 108 or otherwise relevant to what the user is currently doing in UI 108). If the object is in scope, contextual notification agent 118 can invoke contextual notification handler 122. Handler 122 can subsequently process and present the notification in UI 108 "contextually" with respect to the object (in other words, display the notification contents proximate to, or in a manner that modifies the visual appearance or behavior of, the object). For example, in one embodiment, handler 122 may display the notification contents in a "speech bubble" emanating from the visual representation of the object in UI 108. In another embodiment, handler 122 may cause the object move or act out a particular action in UI 108 that reflects the notification contents. In yet other embodiments, handler 122 may take any other action that it deems appropriate for presenting the notification in a contextual fashion.

Significantly, since contextual notification handler 122 is a separate computing process from the main process of application 106, the main application process does not need to be running while the foregoing notification handling workflow is executed—in other words, the main application process can remain dormant while handler 122 carries out its duties. This advantageously reduces the resource consumption of computer system 102, since handler 122 can be configured to be a relatively lightweight process that is solely focused on the task of handling contextual notifications (in contrast to the main process, which will typically be more resource-intensive and implement the entirety, or vast majority, of the functionality of application 106).

At the same time, since contextual notification handler 122 can be distributed as part of application 106 and can be programmed by the application developer, the application developer can control exactly how the contextual notifications for the objects of application 106 will be handled and displayed. In some embodiments, rather than implementing a single handler that is designed to handle contextual notifications for all objects of application 106, the application developer may implement a separate handler for each application object. This notion of per-object notification handlers is described in further detail in section (4) below.

It should be appreciated that system environment 100 of FIG. 1 is illustrative and not intended to limit embodiments of the present disclosure. For example, although only a single application 106 is shown running on computer system 102, any number of applications (each with its own contextual notification handler or group of per-object handlers) may be supported by the framework described herein. Further, although application notification service 110 is shown running on a server 112 that is distinct from computer system 102, in some embodiments the functionality of application notification service 110 may be incorporated into application 106 on computer system 102. Yet further, the various entities shown in system environment 100 may include sub-components or implement other functions that are not specifically described above. One of ordinary skill in the art will recognize many variations, modifications, and alternatives.

3. Object Registration Workflow

Figure 2:
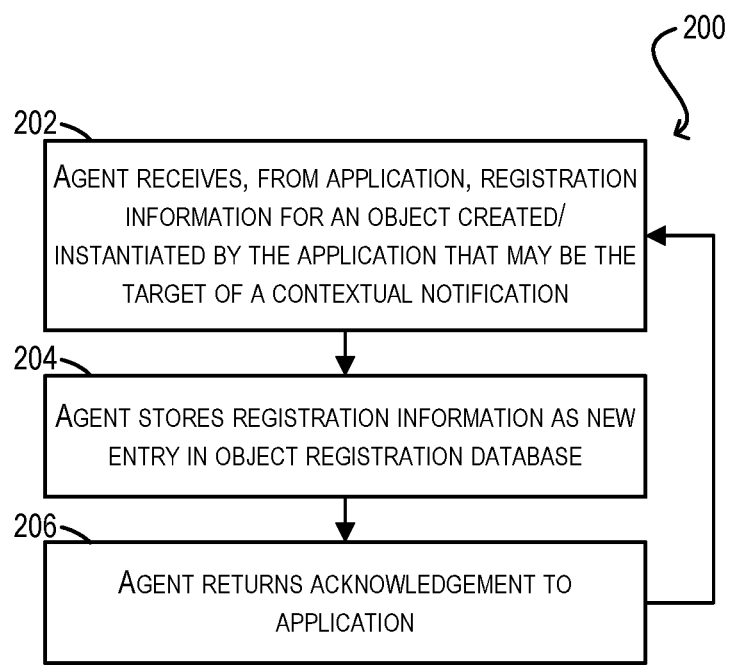
FIG. 2 is a flowchart of an object registration workflow according to certain embodiments.

FIG. 2 depicts a flowchart 200 that details the object registration workflow that may be carried out by contextual notification agent 118 of FIG. 1 according to certain embodiments.

Starting with block 202, contextual notification agent 118 can receive, from application 106 (and/or other applications running on computer system 102), registration information for an object created/instantiated by the application that may be the target of a contextual notification. As mentioned previously, an "object" may be any type of application-created entity that can be visually represented in UI 108 of computer system 102, such as a document object, a user object, an application icon, a UI element, an avatar or object in a 3D environment, etc.

The registration information received at block 202 can include an application ID identifying the application that created the object (e.g., application 106), an object ID identifying the object itself, and a context ID identifying a notification context associated with the object. In some embodiments the registration information may also include other data, such as information identifying a particular contextual notification handler associated with the object (e.g., handler 122).

At blocks 204 and 206, contextual notification agent 118 can store the registration information as an entry in object registration database 120 and can return an acknowledgement to the originating application. The flowchart can then return to block 202 and contextual notification agent 118 can repeat blocks 202-206 for each additional object that application 106 (or other applications) wishes to register.

4. Notification Handling Workflow

Figure 3:
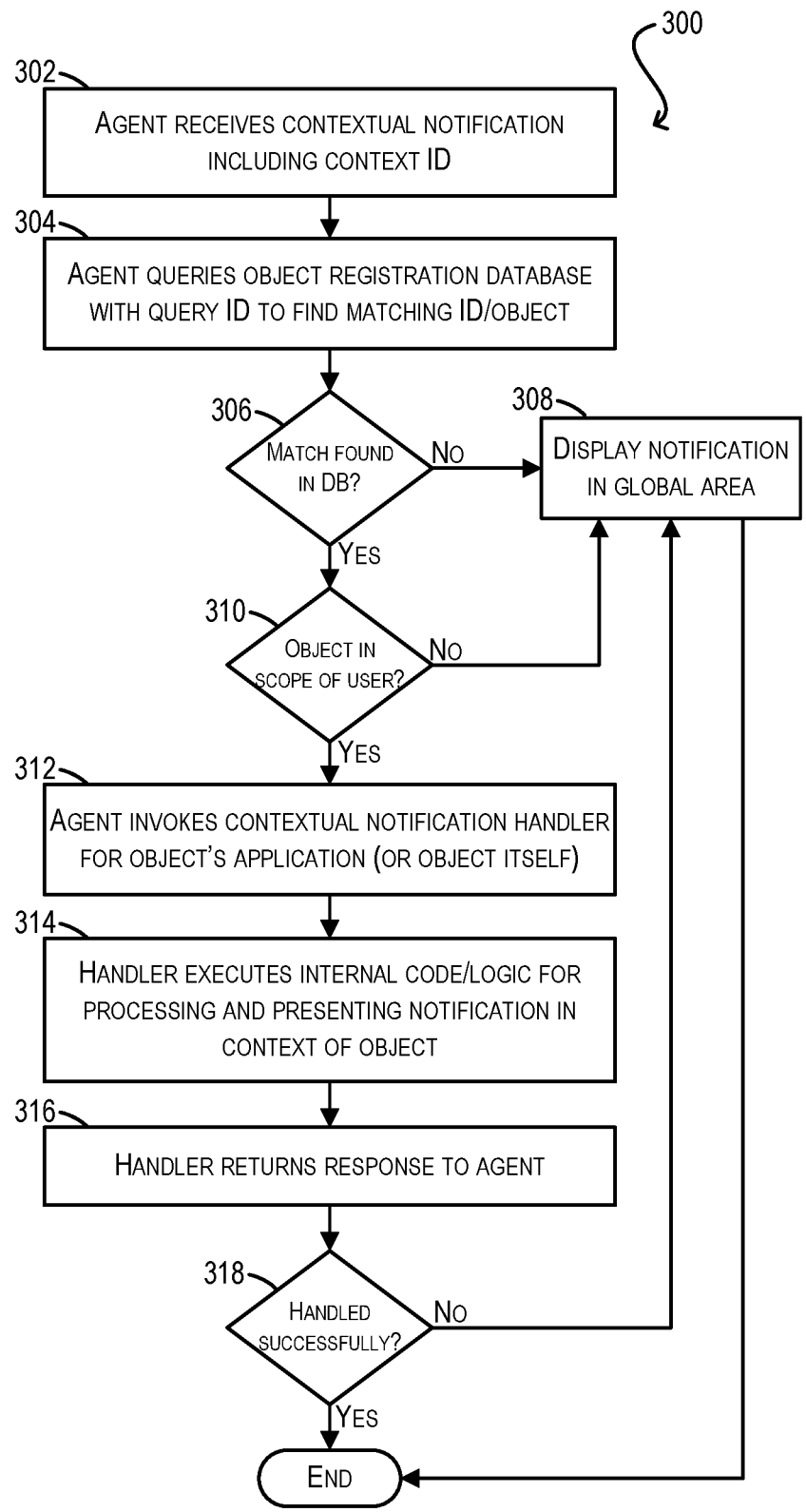
FIG. 3 is a flowchart of a contextual notification handling workflow according to certain embodiments.

FIG. 3 depicts a flowchart 300 that details the notification handling workflow that may be carried out by contextual notification agent 118 and contextual notification handler 122 according to certain embodiments. Flowchart 300 assumes that the object registration workflow of FIG. 2 has been initiated and object registration database 120 has been populated with entries corresponding to the objects created/instantiated by application 106 and/or other applications.

Starting with block 302, contextual notification agent 118 can receive, via OS notification service 114, a contextual notification originating from application notification service 110. The contextual notification can include a notification payload comprising the contents of the notification (e.g., a text message, one or more images, etc.) and a context ID indicating the context for the notification. This notification payload can be structured according to any format that is appropriate for agent 118/OS 104, such as XML (Extensible Markup Language). In some embodiments, the notification payload can also include metadata indicating how the notification should be displayed in a contextual manner.

At blocks 304 and 306, contextual notification agent 118 can query object registration database 120 using the context ID included in the received notification and thus attempt to match that context ID against the context IDs registered to the objects in database 120. If no match is found, contextual notification agent 118 can display the notification in the standard global notification area of OS 104 (block 308) and flowchart 300 can end.

However if a matching context ID and corresponding object is found at block 306, contextual notification agent 118 can move on to determining whether the object is "in scope" of (i.e., currently visible and/or relevant to) a user interacting with UI 108 (block 310). For example, if UI 108 is a traditional 2D computer desktop, block 310 may comprise determining whether the object is visible on the desktop to the user. Alternatively, if the UI 108 is a 3D virtual reality or mixed reality environment, block 310 may comprise determining whether the object is relatively close to the user in the 3D environment (e.g., within visual or speaking distance).

If the object is not in scope of the user at block 310, contextual notification agent 118 can display the notification in the standard global notification area of OS 104 (block 308) and flowchart 300 can end as mentioned before.

On the other hand, if the object is in scope of the user at block 310, contextual notification agent 118 can conclude that the notification should be presented in a contextual manner and thus can invoke an appropriate contextual notification handler for the object (block 312). In one set of embodiments, the appropriate handler may be one that has been defined for the application that created the object (e.g., handler 122 of application 106). In other embodiments, the appropriate handler may be one that has been defined for the object itself (i.e., a per-object handler). In this latter case, the per-object handler may be implemented via a mechanism (such as "live cube" mechanisms) that enables the object to be associated with executable code that can be invoked and run independently of the creating application.

Assuming the handler invoked by agent 118 is contextual notification handler 122 of application 106, at block 314 handler 122 can, according to its internal logic, attempt to process and present the notification in a contextual fashion with respect to the object. Contextual notification handler 122 can then return a response to contextual notification agent 118 (block 316), and agent 118 can evaluate whether the response indicates the notification was handled successfully (block 318). If so, no further action is needed on the part of agent 118 and flowchart 300 can end. If not, contextual notification agent 118 can display the notification in the standard global notification area of OS 104 (block 308) prior to terminating the workflow.

It should be appreciated that flowchart 300 is illustrative and various modifications to the processing in flowchart 300 are possible. For example, although blocks 306 and 308 indicate that contextual notification agent 118 simply displays the notification in the standard notification area of OS 104 if a matching object in database 120 is not found, in some cases agent 118 may alternatively pass the notification to the application to which the notification pertains. The application may then attempt to find the object for the notification per its internal identification/registration mechanisms and forward the notification to the appropriate contextual notification handler for the object.

Further, in some cases contextual notification agent 118 may omit the step of determining whether the matched object is in scope of a user at block 310 and instead directly invoke the object's contextual notification handler. The handler may then perform this check as part of its internal notification handling logic if desired or needed.

5. Example Use Cases

The following subsections describe a few potential use cases for the contextual notification framework of the present disclosure. These are merely provided as examples and are not intended to limit embodiments of the present disclosure.

5.1 Contextual Notifications for User Avatars or Other 3D Objects in a VR/MR Environment In this use case, UI 108 may be a virtual reality (VR) or mixed reality (MR) environment and the objects that are targets of contextual notifications may be user avatars or other 3D objects (e.g., environmental objects, pets, etc.) in the VR/MR environment. Accordingly, upon receiving a contextual notification, agent 118 can match the context ID of the notification to a particular avatar/object in the VR/MR environment and invoke the handler for that avatar/object. The handler can then display the notification in some manner that is reflected by the avatar/object in the VR/MR environment (e.g., user avatar speaks out a message or moves in a certain way, pet object barks or wags tail, television object starts playing a particular show or displays a particular image, etc.).

5.2 Contextual Notifications for Icons/Elements in a Computer Desktop

In this use case, UI 108 may be a traditional computer desktop or other similar 2D UI and the objects that are targets of contextual notifications may be icons or elements (e.g., application icons, documents, folders, devices, windows, etc.) that appear on the desktop. Accordingly, upon receiving a contextual notification, agent 118 can match the context ID of the notification to a particular icon or element in the desktop and invoke the handler for that icon/element. The handler can then display the notification in some manner that is reflected by the icon/element in the desktop (e.g., document object moves or displays an indicator showing that it has been edited, device icon becomes grayed out to indicate that the device is now offline, application icon is updated to show a change in state for the application, etc.).

6. Computer System Architecture

Figure 4:
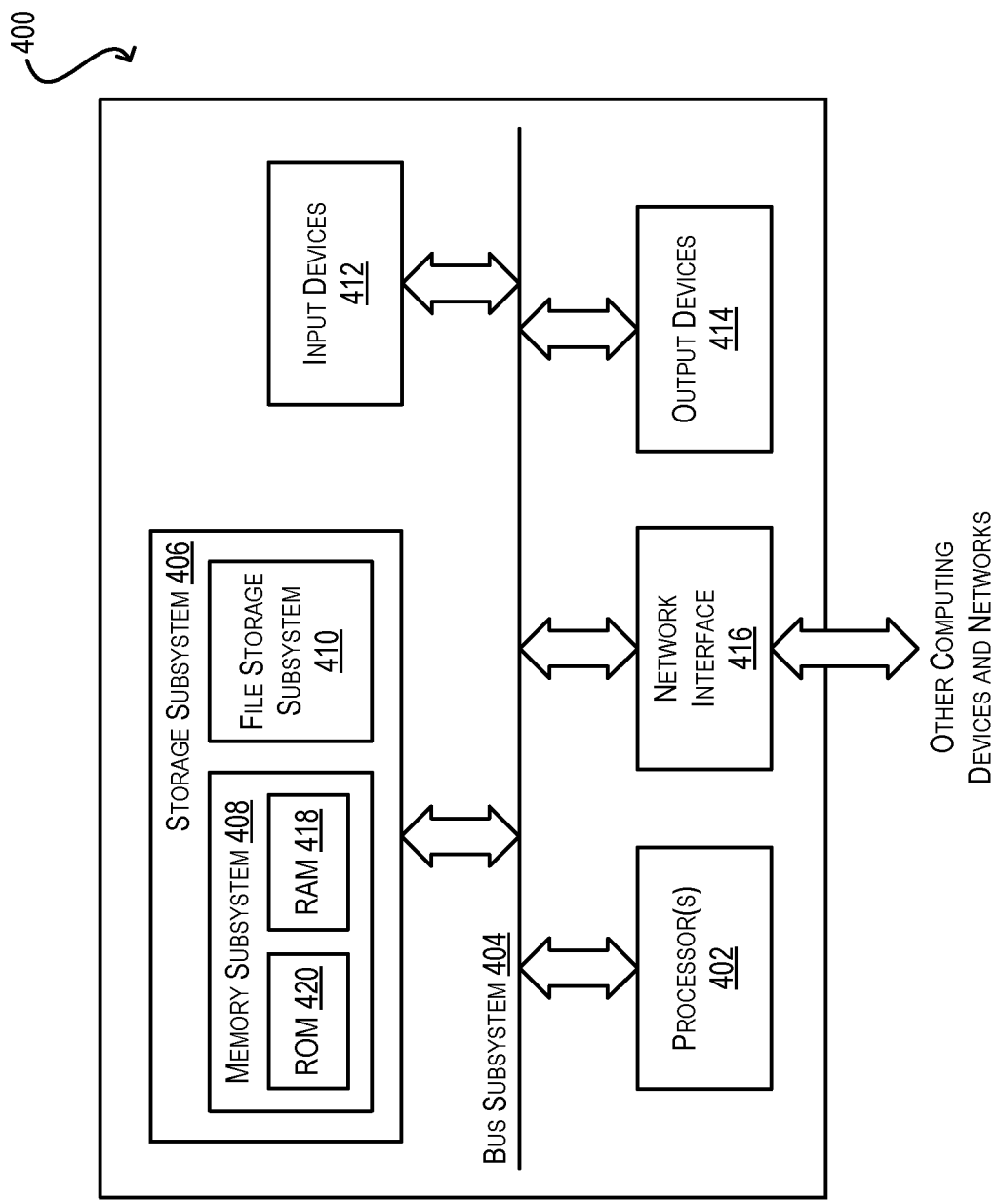
FIG. 4 is a simplified block diagram of the architecture of a computer system according to certain embodiments.

FIG. 4 is a simplified block diagram illustrating the architecture of an example computer system 400 according to certain embodiments. Computer system 400 (and/or equivalent systems/devices) may be used to implement computer system 102 of FIG. 1. As shown in FIG. 4, computer system 400 includes one or more processors 402 that communicate with a number of peripheral devices via a bus subsystem 404. These peripheral devices include a storage subsystem 406 (comprising a memory subsystem 408 and a file storage subsystem 410), user interface input devices 412, user interface output devices 414, and a network interface subsystem 416.

Bus subsystem 404 can provide a mechanism for letting the various components and subsystems of computer system 400 communicate with each other as intended. Although bus subsystem 404 is shown schematically as a single bus, alternative embodiments of the bus subsystem can utilize multiple busses.

Network interface subsystem 416 can serve as an interface for communicating data between computer system 400 and other computer systems or networks. Embodiments of network interface subsystem 416 can include, e.g., an Ethernet module, a Wi-Fi and/or cellular connectivity module, and/or the like.

User interface input devices 412 can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information into computer system 400.

User interface output devices 414 can include a display subsystem and non-visual output devices such as audio output devices, etc. The display subsystem can be, e.g., a transparent or non-transparent display screen such as a liquid crystal display (LCD) or organic light-emitting diode (OLED) display that is capable of presenting 2D and/or 3D imagery. In general, use of the term "output device" is intended to include all possible types of devices and mechanisms for outputting information from computer system 400.

Storage subsystem 406 includes a memory subsystem 408 and a file/disk storage subsystem 410. Subsystems 408 and 410 represent non-transitory computer-readable storage media that can store program code and/or data that provide the functionality of embodiments of the present disclosure.

Memory subsystem 408 includes a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computer system 400 is illustrative and other configurations having more or fewer components than computer system 400 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a computer readable storage medium having stored thereon program code that, when executed by the processor, causes the processor to:
   receive a notification including a first context identifier;
   attempt to match the first context identifier to an object created or instantiated by an application running on the computer system;
   if the attempt to match is unsuccessful, display the contents of the notification in a global notification area of a user interface of the computer system, wherein the user interface is a three-dimensional (3D) virtual reality (VR) or augmented reality (AR) environment, and wherein the global notification area is configured to hold notifications generated by a plurality of different applications running on the computer system;
   if the attempt to match is successful, determine whether the object is within a threshold relevancy distance of a user in the 3D VR or AR environment;
   if the object is not within the threshold relevancy distance, display the contents of the notification in the global notification area; and
   if the object is within the threshold relevancy distance, invoke a notification handler associated with the object or with the application, wherein the notification handler is configured to present, in the 3D VR or AR environment, contents of the notification proximate to, or in a manner that modifies a visual appearance or behavior of, the object in the 3D VR or AR environment.

2. The computer system of claim 1 wherein the object is a three-dimensional object in the 3D VR or MR environment.

3. The computer system of claim 1 wherein the program code further causes the processor to, prior to receiving the notification, register the object in an object registration database.

4. The computer system of claim 3 wherein the program code that causes the processor to register the object in the object registration database comprises program code that causes the processor to:
   receive, from the application, registration information for the object comprising an application identifier identifying the application, an object identifier identifying the object, and a second context identifier identifying a notification context associated with the object; and
   store the registration information in a database entry for the object.

5. The computer system of claim 4 wherein the program code that causes the processor to attempt to match the first context identifier to the object comprises program code that causes the processor to:
   query the object registration database using the first context identifier; and
   attempt to match the first context identifier with the second context identifier included in the database entry for the object.

6. The computer system of claim 1 wherein if the attempt to match is unsuccessful, the program code further causes the processor to pass the notification to the application and, upon receiving the notification, the application is configured to attempt to find an object that matches the first context identifier.

7. The computer system of claim 1 wherein the notification handler is a computing process that is separate from a main process of the application.

8. The computer system of claim 1 wherein the notification handler is defined by a developer of the application.

9. The computer system of claim 1 wherein the notification handler is a per-object handler that comprises code for handling contextual notifications with respect to the object.

10. The computer system of claim 1 wherein the notification handler is a per-application handler that comprises code for handling contextual notifications with respect to all objects created or instantiated by the application.

11. The computer system of claim 1 wherein the program code further causes the processor to, upon invoking the notification handler:
    receive, from the notification handler, a response indicating whether the notification handler was able to successfully present the contents of the notification proximate to, or in the manner that modifies the visual appearance or behavior of, the object; and
    if the response indicates that the notification handler was unable to successfully present the contents of the notification proximate to, or in the manner that modifies the visual appearance or behavior of, the object, the program code further causes the processor to display the contents in the global notification area.

12. The computer system of claim 1 wherein the notification further includes metadata defining how the notification handler should present the contents of the notification proximate to, or in the manner that modifies the visual appearance or behavior of, the object.

13. A method comprising:
    receiving, by an operating system of a computer system, a notification including a context identifier;
    attempting, by the operating system, to match the context identifier to an object created or instantiated by an application running on the computer system;
    if the attempting to match is unsuccessful, displaying, by the operating system, the contents of the notification in a global notification area of a user interface of the computer system, wherein the user interface is a three-dimensional (3D) virtual reality (VR) or augmented reality (AR) environment, and wherein the global notification area is configured to hold notifications generated by a plurality of different applications running on the computer system;
    if the attempting to match is successful, determining, by the operating system, whether the object is within a threshold relevancy distance of a user in the 3D VR or AR environment;
    if the object is not within the threshold relevancy distance, displaying, by the operating system, the contents of the notification in the global notification area; and
    if the object is within the threshold relevancy distance, invoking, by the operating system, a notification handler associated with the object or with the application, wherein the notification handler is configured to present, in the 3D VR or AR environment, contents of the notification proximate to, or in a manner that modifies a visual appearance or behavior of, the object in the 3D VR or AR environment.

14. A non-transitory computer readable storage medium having stored thereon program code executable by a computer system, the program code causing the computer system to:

receive a notification including a context identifier;

attempt to match the context identifier to an object created or instantiated by an application running on the computer system;

if the attempt to match is unsuccessful, display the contents of the notification in a global notification area of a user interface of the computer system, wherein the user interface is a three-dimensional (3D) virtual reality (VR) or augmented reality (AR) environment, and wherein the global notification area is configured to hold notifications generated by a plurality of different applications running on the computer system;

if the attempt to match is successful, determine whether the object is within a threshold relevancy distance of a user in the 3D VR or AR environment;

if the object is not within the threshold relevancy distance, display the contents of the notification in the global notification area; and if the object is within the threshold relevancy distance, invoke a notification handler associated with the object or with the application, wherein the notification handler is configured to present, in the 3D VR or AR environment, contents of the notification proximate to, or in a manner that modifies a visual appearance or behavior of, the object in the 3D VR or AR environment.

15. The computer system of claim 1 wherein presenting the contents of the notification contextually with respect to the object in a manner that modifies a behavior of the object comprises causing the object to move or act within the 3D VR or AR environment in a manner that reflects the contents of the notification.

* * * * *